A. H. BRYANT.

Egg-Carriers.

No. 5,293. Reissued Feb. 25, 1873.

WITNESSES.

E. P. Bates

Phil. C. Masi

INVENTOR.

A. H. Bryant,

Chipman & Osmun & Co.,

Attorneys.

A.M. PHOTO-LITHOGRAPHIC CO. N.Y. (OSBORNE'S PROCESS.)

UNITED STATES PATENT OFFICE.

ABNER H. BRYANT, OF NEW YORK, N. Y.

IMPROVEMENT IN EGG-CARRIERS.

Specification forming part of Letters Patent No. 129,313, dated July 16, 1872; reissue No. 5,293, dated February 25, 1873.

*To all whom it may concern:*

Be it known that I, ABNER H. BRYANT, of New York, in the county of New York and State of New York, have invented a new and valuable Improvement in Egg-Carriers; and I do hereby declare that the following is a clear and exact description of the construction and operation of the same, reference being had to the annexed drawing making a part of this specification, and to the letters and figures of reference marked thereon.

Figure 1:
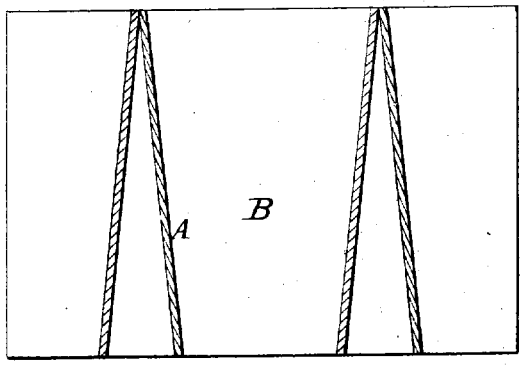
Figure 2:
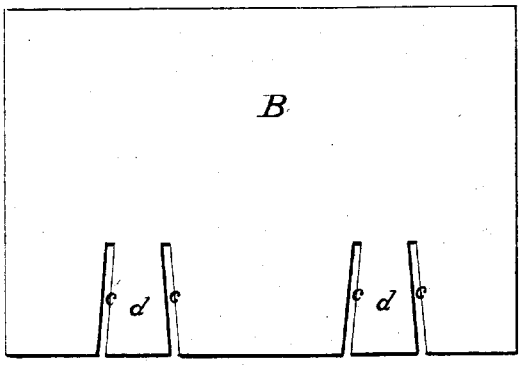
Figure 3:
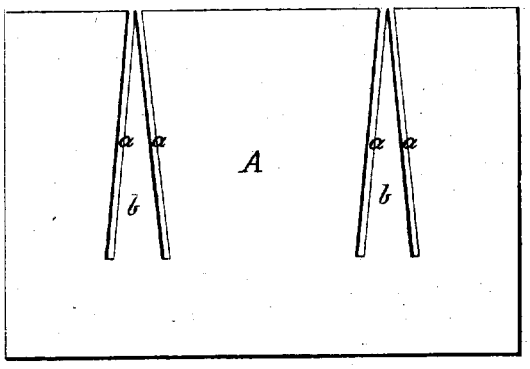
Figure 4:
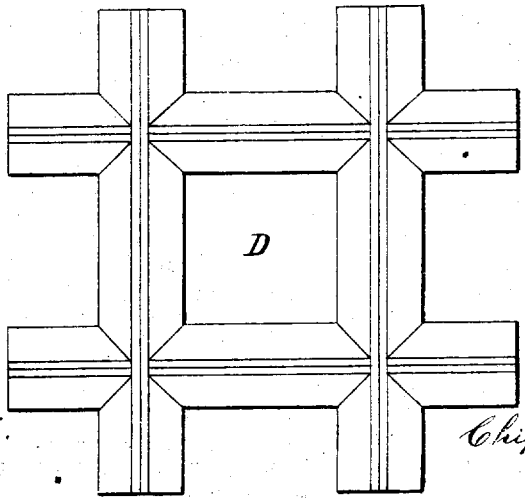

Figure 1 of the drawing is a vertical section of one of the pockets of my egg-carrier, whether taken longitudinally or transversely. Fig. 2 is a side view of one of the strips used in its construction. Fig. 3 is a side view of the other strip employed, and Fig. 4 is a plan view of the pocket.

This invention has relation to an economical means of constructing egg-pockets, whereby they shall be each surrounded on all sides by lateral air-spaces inclosed between double partition-walls of elastic or flexible character; and it consists in the construction and novel arrangement of the pairs of longitudinal and transverse strips of pasteboard or other elastic material fitted and interwoven together by means of double slits made in their upper and under edges, and forming a net-work of pockets, each of which has a double wall on every side of flexible character, yet sufficiently elastic and firm to keep the inside faces of the partitions in contact with the egg, preventing the same from shaking loosely about in its pocket. The object of this invention is to provide an economical carrier for the transportation of eggs, which shall at the same time serve its purpose in an efficient manner; and in order to accomplish this result the strips above referred to are made of equal width, and respectively provided with intersection slits arranged in pairs.

Referring to the accompanying drawing illustrating this invention, A represents a strip of pasteboard or its equivalent, in the upper portion of which are formed the slits *a a*, arranged in pairs, each pair being distant from the adjacent pairs the width of the pockets to be formed. B designates a strip of pasteboard of equal width to the strip A, and having slits *c c*, also arranged in pairs, extending from the lower edge upward, running in the same directions from their upper ends as would continuations of the slits *a a*, and about equal in length to said continuations if the same should extend to the lower edge of the strip A. Each pair of slits is separated by a tongue, as shown at *b* between the slits *a a*, and at *d* between the slits *c c*. Sometimes the slits will be made a little oblique, as illustrated in the drawing, in which case the tongues will be somewhat angular, and the pockets formed by the intersection of the strips tapering. In weaving these strips together to form the pockets, represented by D in the drawing, the strips A are brought underneath the strips B at right angles thereto. Two of the strips A are placed beneath the coinciding pairs of slits *c* in the strips B. The strips B are then pressed down over the strips A in such a manner that the tongues *b* shall enter the space between the strips B, while the strips B pass into the slits *a*, the strips A entering at the same time, as far as possible, the slits *c*. The upper and lower edges of the series of transverse and longitudinal strips being made to coincide, the result is the double-walled pocket or pockets represented by D. The tongues *b* and *d* serve to keep the walls of the egg-pockets apart, at the same time rendering them strong and stiff enough to prevent the eggs from getting too close together or from slipping out of place. Hence, when these tongues are used, thinner and less expensive stock may be employed than in cases where the tongues are dispensed with. In forming tapering pockets, instead of using single strips of pasteboard with the slits *a* cut from the edges thereof, a strip of double width may be used, the points of the angular tongues *b* meeting at a middle line, and the strip folded over along said line. The strips B may also be of double width when the pockets are tapering, the slits *c* being cut from both edges, and the strips folded along the middle line. The same effect can be produced by alternating in the same strip the upper and lower pairs of slits, the cross-strips being woven in, respectively, from the top and bottom.

What I claim as my invention, and desire to secure by Letters Patent, is—

1. In an egg carrier or tray, the strips A having the slits *a* cut in pairs in their upper edges, in combination with the strips B having the slits *c* cut in pairs in their lower edges, the slits of each pair in each strip being separated by tongues *b* and *d*, respectively, substantially as specified.

2. The longitudinal and transverse interlacing strips having the pairs of intersection slits extending from their upper and lower edges, respectively, downward and upward to about the same line, substantially as specified.

In testimony that I claim the above I have hereunto subscribed my name in the presence of two witnesses.

ABNER H. BRYANT.

Attest:
D. D. KANE,
GEO. E. UPHAM.